(12) United States Patent
Voth et al.

(10) Patent No.: US 7,687,011 B2
(45) Date of Patent: Mar. 30, 2010

(54) DEVICE AND METHOD FOR CONTROLLING THE TEMPERATURE OF PREFORMS

(75) Inventors: Klaus Voth, Obertraubling-piesenkofen (DE); Helmut Asbrand, Bad Abbach (DE); Heinrich Deyerl, Tenuz (DE)

(73) Assignee: Krones AG, Neutraubling (DE)

( * ) Notice: Subject to any disclaimer, the term of this patent is extended or adjusted under 35 U.S.C. 154(b) by 1516 days.

(21) Appl. No.: 10/487,007

(22) PCT Filed: Sep. 11, 2002

(86) PCT No.: PCT/EP02/10178

§ 371 (c)(1),
(2), (4) Date: Aug. 12, 2004

(87) PCT Pub. No.: WO03/022551

PCT Pub. Date: Mar. 20, 2003

(65) Prior Publication Data

US 2005/0046085 A1   Mar. 3, 2005

(30) Foreign Application Priority Data

Sep. 11, 2001  (DE) ................................ 101 44 537

(51) Int. Cl.
*B29C 49/12* (2006.01)
*B29C 49/64* (2006.01)

(52) U.S. Cl. ...................... 264/520; 264/521; 264/532; 425/526; 425/529

(58) Field of Classification Search ................. 425/526, 425/529; 264/520, 521, 532
See application file for complete search history.

(56) References Cited

U.S. PATENT DOCUMENTS

| | | | | |
|---|---|---|---|---|
| 3,439,380 A | * | 4/1969 | Seefluth | 425/156 |
| 3,787,170 A | * | 1/1974 | Gilbert | 432/5 |
| 3,934,743 A | | 1/1976 | McChesney et al. | |
| 4,151,249 A | | 4/1979 | Lee | |
| 4,285,657 A | * | 8/1981 | Ryder | 425/525 |
| 4,564,497 A | | 1/1986 | Ota et al. | |
| 4,605,839 A | * | 8/1986 | Rasmussen et al. | 392/420 |
| 5,232,641 A | | 8/1993 | Williamson et al. | |
| 5,256,341 A | * | 10/1993 | Denis et al. | 264/492 |

FOREIGN PATENT DOCUMENTS

| | | | |
|---|---|---|---|
| DE | 1816489 | 8/1970 | |
| DE | 2852061 C2 | 10/1984 | |
| DE | 19608570 A1 | 9/1997 | |
| EP | 0521773 B1 | 6/1992 | |
| EP | 0947304 A2 | 7/1998 | |
| JP | 60061228 A | * 4/1985 | ................. 264/532 |
| JP | 60073830 A | 4/1985 | |
| JP | 60073830 A | * 4/1985 | |
| JP | 62077919 A | 4/1987 | |
| JP | 04049023 A | 2/1992 | |

(Continued)

*Primary Examiner*—Robert B Davis
(74) *Attorney, Agent, or Firm*—Marshall, Gerstein & Borun LLP

(57) ABSTRACT

A device and a method used to temper preforms in the manufacture of bottles, in which a tempering device is provided to selectively and directly temper the preforms, and is inserted into preforms. The method provides that the preforms are directly tempered from the inside.

19 Claims, 7 Drawing Sheets

FOREIGN PATENT DOCUMENTS

| | | | |
|---|---|---|---|
| JP | 04049023 A | * | 2/1992 |
| JP | 06198719 A | | 7/1994 |
| JP | 06278196 A | | 10/1994 |
| JP | 09019957 A | | 1/1997 |
| JP | 2000343590 A | * | 12/2000 |

* cited by examiner

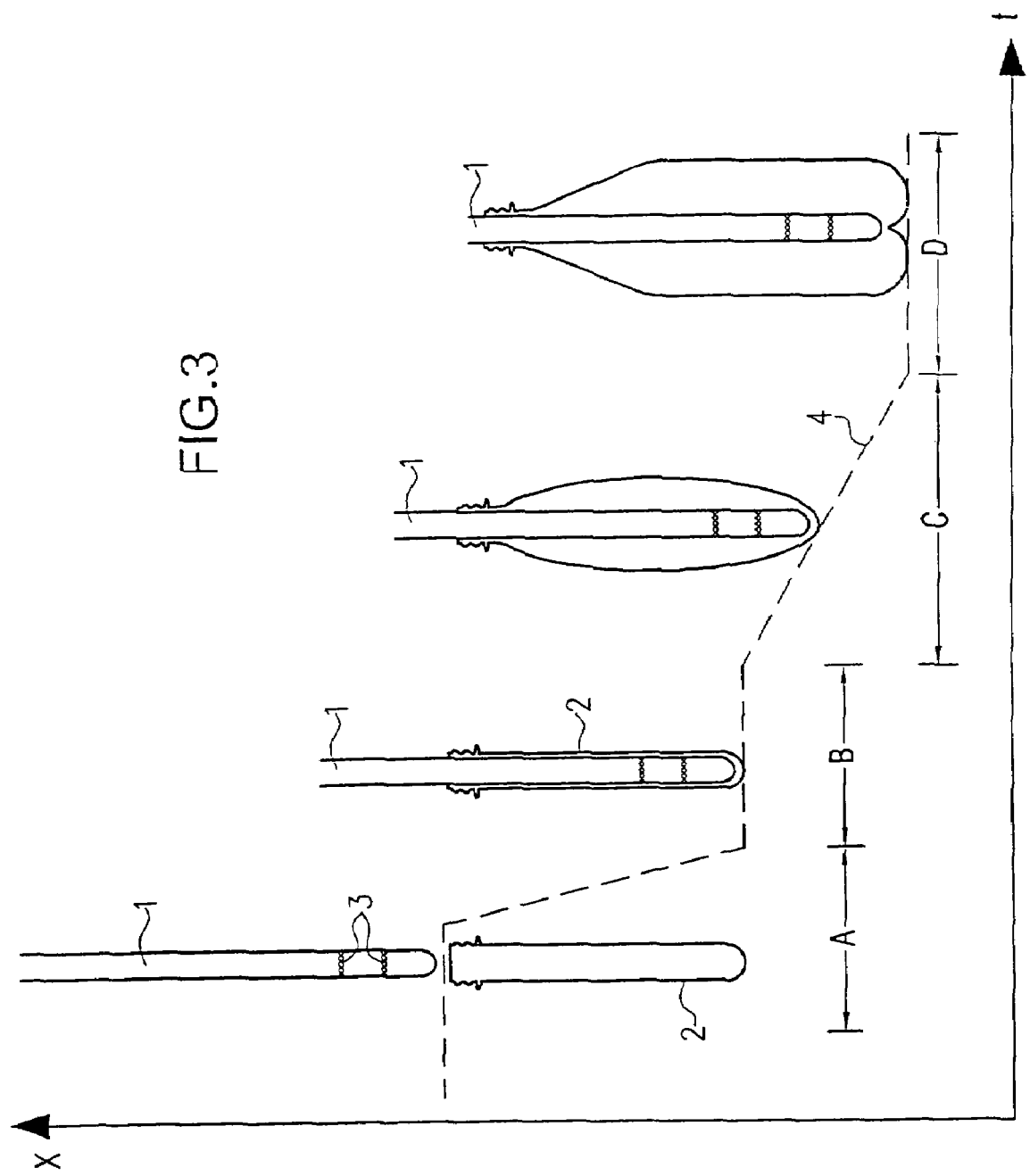

DEVICE AND METHOD FOR CONTROLLING THE TEMPERATURE OF PREFORMS

FIELD OF THE INVENTION

The invention relates to a device and method to temper preforms in the manufacture of bottles, etc. that comprises a tempering device to selectively and directly temper preforms.

BACKGROUND OF THE INVENTION

Preforms are tempered so that the part of the preform to be deformed in a mold blowing process is heated to ensure its deformability. Normally, the preform has a head area with a thread and collar that is not to be deformed and is heated moderately or not at all. Furthermore, the preform normally has a finger-shaped area that is to be deformed in the mold blowing process. The phrase "tempering of preforms" refers in the following to the tempering of areas that are to be deformed, i.e., usually in the finger-shaped area.

Selectively tempering preforms serves to deform various areas in the preform that have different temperatures. In the deforming process in which a bottle, etc. is made from the preform, the areas that are tempered differently are expanded to different degrees. On the one hand, this makes it possible to form walls of varying thickness in different areas of the bottle. On the other hand, selective tempering can be used to counteract the differing expansion of the preform material during the preforming process that arises from the asymmetrical shaping of oval, rectangular or otherwise asymmetrically shaped models to avoid large differences in wall thickness.

A generic device is for example described in U.S. Pat. No. 4,151,249. With this device, preforms are selectively tempered from the outside to create ribs in a bottle. The tempering process can involve either heating or cooling.

DE 19608570 A1 also discloses a generic device for selectively tempering preforms.

A disadvantage manifested by such devices and methods is that the preforms with thick walls of several millimeters can only be unevenly heated through the thick walls. For this reason, substantial stress arises within the material in the mold blowing process.

Wait times to allow the temperature to equalize between the inside and outside of the preform are contrary to high preform throughput rates.

EP521773 B1 discloses the possibility of heating preforms indirectly from the inside by placing an object in the preform and heating it from the outside.

A disadvantage manifested by such devices is that indirectly heating the preform causes the system to become very slow, i.e. heating by using an object that itself has to be heated. The internal body only slowly reacts to changes in the heated supplied from the outside so that the preform is subsequently heated or cooled at a much later time.

When manufacturing bottles at a high throughput rate where brief production stops can arise, this is a major disadvantage since the supply of heat cannot be stopped quickly enough.

Furthermore, DE2852061 discloses a method in which finished bottles are homogenously pre-cooled from the inside.

SUMMARY OF THE INVENTION

The task is achieved by a device with the features of claim 1 and a method with the features of claim 13.

The device according to the invention provides a tempering device that is introduced into the preforms. The tempering device must be shaped such that it can be inserted into the preforms. Furthermore, the tempering organs such as gas outlets or radiant heaters that are part of the tempering device must be easily insertable into the preform. In addition, they must be designed so that they can temper the preform from the inside. The tempering device is designed to selectively and directly temper. This means that different areas of the preform can be tempered differently. "Tempering" means both heating and cooling.

"Directly tempering" means that the tempering device directly tempers the preform without intermediate elements being used for tempering. This includes for example contacting the preform with gas that has a higher or lower temperature relative to the temperature of the preform.

Directly tempering also includes heating with radiant heaters or similar heating elements that directly heat the preform.

In an advantageous embodiment of the device according to invention, the tempering device is designed such that the preforms can be tempered in zones along and/or perpendicular to and/or at an angle to the preform axis. The preform access is the axis of the preform that lies in the middle of the preform along its greatest length.

In an advantageous embodiment of the invention, a preheating device is provided that can evenly heat the preform.

In a particularly advantageous embodiment of the invention, the tempering device comprises at least one gas conducting device and to a gas outlet that fills the preform with cooled/heated gas. By applying cooled/heated gas, especially air, to the preform, the preform can be quickly tempered to the selected temperature.

Another advantageous embodiment of the invention is to provide at least one gas inlet for the tempering device to receive gas from the preform. With such a gas inlet, the heated or cooled gas can be directly returned to the tempering device after contacting the preform. This keeps sites of the preform from being heated and cooled that are not to be heated or cooled even though gas flows by them.

Advantageous embodiments of the gas inlets and/or gas outlets are slots, holes, nozzles or other apertures in the tempering device. If slots allow a fast gas throughput and homogeneous tempering of the preform surface. Slots allow a high gas throughput as well as the homogenous tempering of the preform surfaces exposed to the gas stream leaving the slots. Holes are relatively easy and economical to create. Nozzles have the advantage of forming a well-aimed gas stream that can temper highly selective areas. In one advantageous embodiment of the invention, there are several gas inlets and/or several gas outlets arranged in circles and/or lines. With such arrangements of gas inlets and outlets, it is possible to selectively temper circular or linear areas of the preform.

In one particularly advantageous embodiment of the invention, the tempering device comprises first and second tubular elements. The two tubular elements can move, especially rotate and/or shift, in relation to each other. The two tubular elements each have arrangements of gas outlets that can overlap when the two tubular elements are in different positions. By moving the two tubular elements in relation to each other, different gas outlet configurations can be created that, for example, selectively temper in one arrangement, and evenly temper in a second arrangement. When they are used to selectively temper, one gas outlet is only in specific, very limited areas of the tempering device such that the preform is only contacted with gas in specific, very limited areas. Even tempering is attained when gas exits through a comparatively large number of sites over the tempering surface so that basically the entire preform is contacted by gas. Homogenous tempering also occurs whenever the distance between the gas outlets and the preform wall is great so that the exiting gas stream can greatly expand.

In another particularly advantageous embodiment, the tempering device is at least partially integrated in the stretch rod of a blow molding device. Blow molding devices have a stretch rod that stretches the preheated preform. Integrating the tempering device at least partially in the stretch rod has the advantage that no additional elements need to be designed for insertion into the preform since the stretch rod for the blow molding device is already designed to be inserted in a preform. Combining the stretch rod and the tempering device into a single component allows the device according to the invention to be designed compactly and economically.

In another advantageous embodiment of the invention, the tempering device is provided with a transport device that can transport the preform from a preheating device to a blow molding device. Systems that already have a preheating device and a blow molding device can be retrofitted with the device for selectively and directly tempering the preforms so that the system can be converted and does not have to be completely exchanged. This is very advantageous for reasons of costs.

In particularly advantageous embodiments of the method according to the invention, the bottles manufactured with the tempering device are cooled. This is particularly advantageous for so-called "hot fill" bottles.

In another advantageous embodiment of the method, the stretch rod is first inserted into an evenly preheated preform. Then the preform is selectively tempered with the tempering device in the stretch rod, during which the stretch rod is not moved relative to the preform. Then the preform is stretched and blow-molded, whereby the stretch rod is used to stretch the preform.

Means are advantageously provided to move the tempering device in and out of the preform. The means can be similar or equivalent to those used to lift and lower stretch rods.

BRIEF DESCRIPTION OF THE DRAWINGS

In the following, the embodiment of the device according to the invention and the method according to the invention will be explained with reference to the accompanying figures.

Shown are.

DETAILED DESCRIPTION OF THE INVENTION

Figure 1:
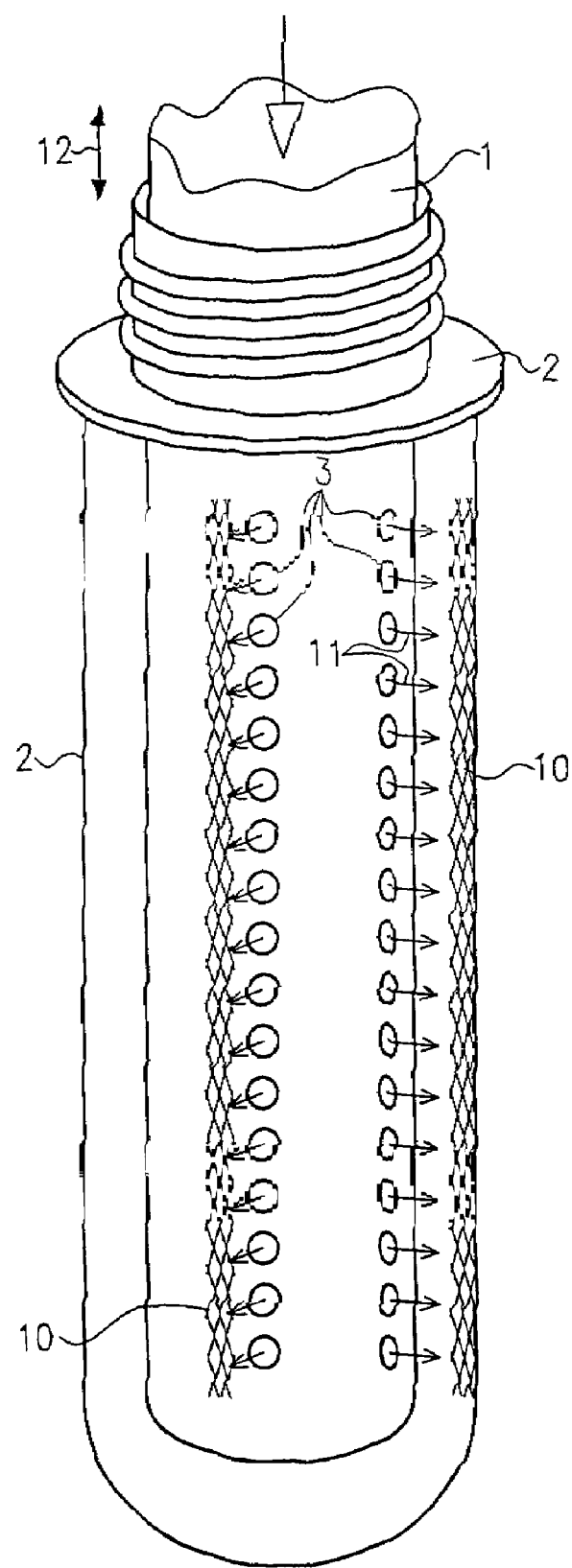
FIG. 1 Schematic representation of an embodiment of the device according to the invention, FIG. 2 Schematic representations of other embodiments of the device according to the invention, FIG. 3 Schematic representation of an embodiment of the method according to the invention, FIG. 4 Schematic representation of an embodiment of the invention together with a preform and a finished bottle, FIG. 5 Schematic drawing of a section of the device according to the invention together with a rectangular blow mold, FIG. 6 Another embodiment of the device according to the invention, FIG. 7 Schematic drawing of the arrangement of different devices that are used in fabricating bottles.

FIG. 1 shows a preform 2 that has a thread and a collar in its top area. The bottom finger-like area that is below the collar is deformed in a mold blowing process to produce a bottle. To selectively preheat this bottom, finger-like area, a tempering device 1 is inserted into the preform 2 that can be moved in and out following directions 12. The tempering device 1 comprises gas outlets 3 by means of which gas can be guided in directions 11 toward the preform wall 2. By applying gas to the preform 2 in directions 11, the preform 2 is selectively and directly tempered in the zones 10. The tempering can either be heating or cooling depending on whether a gas is used whose temperature is above or below the temperature of the preform. A gas heater can be provided to heat the gas that leaves the tempering device 1. This gas heater can be provided either in the tempering device as well as in or adjacent to a gas line for the tempering device 1.

Figure 2A:
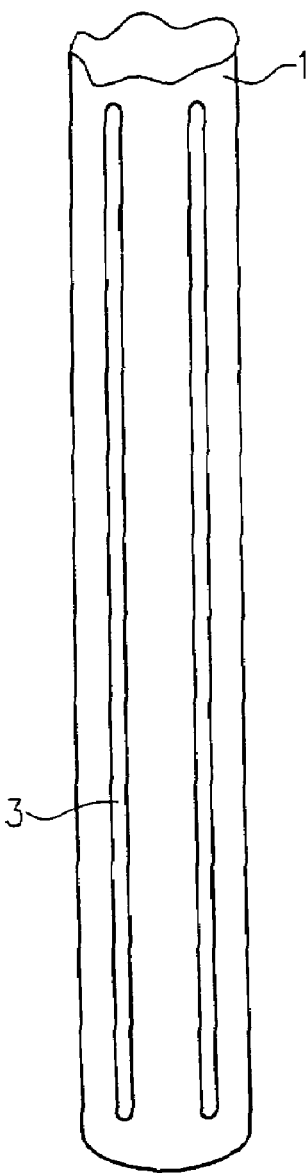
Figure 2B:
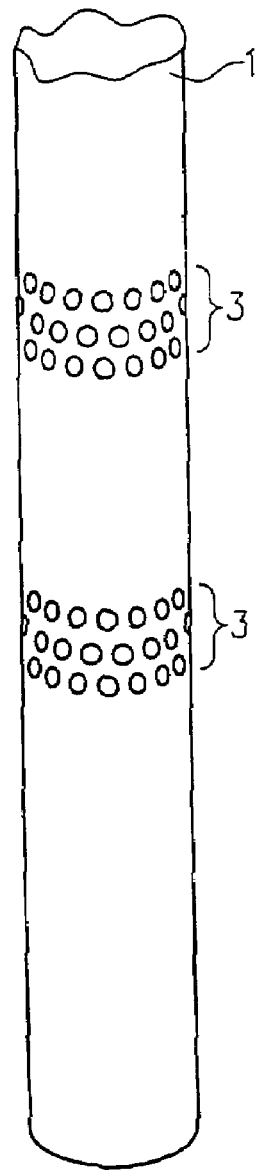
Figure 2C:
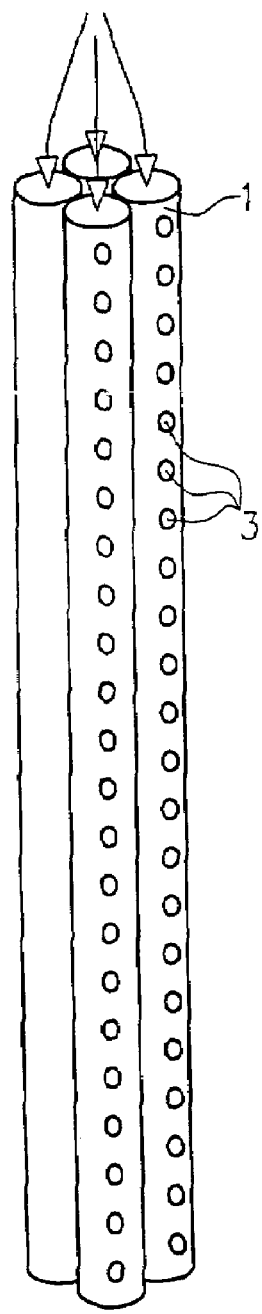

FIG. 2 shows special embodiments of the tempering device 1 according to the invention. In FIG. 2*a*, there is a tubular piece 1 that has slots 3 through which the gas can leave. In FIG. 2*b*, there are two circular areas with openings 3 through which gas can be applied to the preform. In FIG. 2*c*, several tubular pieces are combined to form a bundle to produce the tempering device 1. In each of the tubular sections, there are openings by means of which gas can be applied to the preform. Each of the openings shown in FIG. 2 can also be used to return the gas released from the preform through an opening 3 back into the tempering device 1. This allows specific flow profiles to be created for tempering sharply delimited zones of the preform.

FIG. 3 is a sketch of an embodiment of the method according to the invention. An embodiment of the device according to the invention is used in which the tempering device 1 is integrated into the stretch rod 1.

In a first step A, the tempering device 1 with openings 3 arranged in a circle is inserted into an evenly preheated preform 2. The line 4 indicates the position x as a function of the time t of the bottom end of the tempering device 1. After insertion A, the tempering device 1 is not moved for a while relative to the preform 2 (step B). During this period, cooling or heating air is blown out through the openings 3 to selectively temper the preform 2. In one possible embodiment of the method according to the invention, the tempering device 1 is withdrawn from the preform 2 after step B (not shown in FIG. 3) which terminates the selective tempering method.

In another possible embodiment of the method according to the invention, the tempering device 1 stretches the selectively preheated preform in step C. This means that the tempering device 1 is moved further downward to stretch the preform 2. By introducing blow mold process gas into the preform 2, the preform material is pressed outward against a blow mold (not shown in FIG. 3) to produce the final external bottle shape. The blow mold process gas can be introduced into the preform through the top opening of the preform past the stretch rod, or also through the stretch rod.

In another possible embodiment of the method according to the invention, after step C, cooling gas is applied to the finished bottle in step D to evenly cool the finished bottle.

Figure 4:
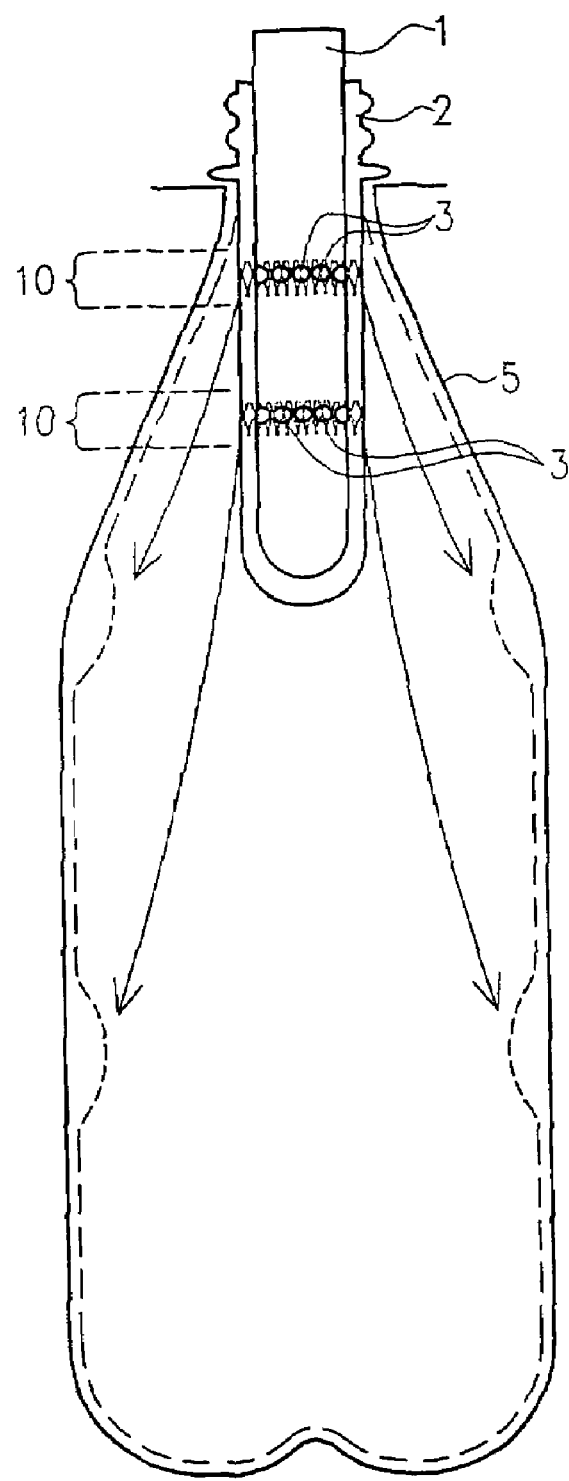

FIG. 4 shows the initial and final stage of the preform 2 as well as the finished bottle that is produced using the method shown in FIG. 3. Located in preform 2 is the tempering device 1 that has gas outlets 3 by means of which the zones 10 of the preform 2 are cooled. Cooling causes the preform material to be tougher in the zones 10 in comparison to the parts of the preform 2 surrounding the zones 10. The blow mold 5 shown in FIG. 4 provides the external shape of the finished bottle.

In the blow molding process has shown in step C in FIG. 3, the bottle shown in FIG. 4 is created from the preform 2 shown in FIG. 4, whereby only the inside of the bottle is shown in dashed lines. The outside the bottle is shaped by a blow mold 5. Given the increased toughness of the zones 10 of the preform 2, they are stretched less than the other areas. This produces the bulges in the finished bottle shown in FIG.

4 that encircle the bottle. Such bulges can be suitable to enhance the stability of the bottle in special areas, particularly where the bottle is held.

Figure 5:
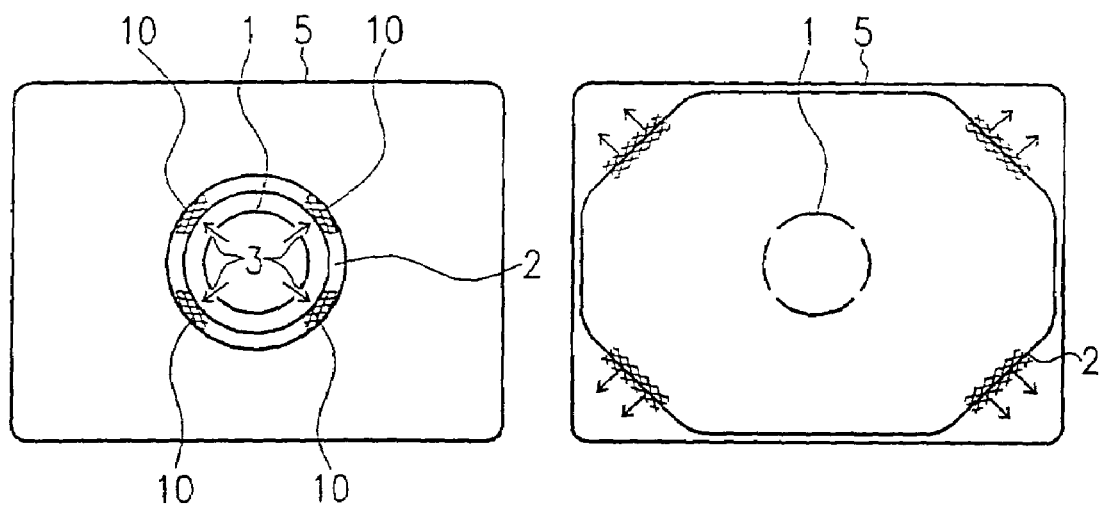

FIG. 5 shows the advantageous manner in which a bottle with a rectangular shape is made using the method according to the invention and the device according to the invention. A sectional view is shown that results from a horizontal section through the device in FIG. 1. On the left in FIG. 5, there is a preform 2 with cooled zones 10 that holds a tempering device 1 with openings 3. The preform 2 surrounds the rectangular blow mold 5. By means of the blow molding process, the diameter of the preform 2 is expanded as shown in FIG. 5 on the right. The areas of the preform 2 that contact the blow mold 5 are stretched less strongly in the blow molding process than those areas that can extend to the right into the corners corresponding to the arrows in FIG. 5. Pre-cooling the zones 10 that extend into the corners causes them to only stretch slightly in the initial part of the blow molding process. Sufficient residual material strength is in these areas that are thinned upon being stretched into the corners of the blow mold. Despite the rectangular shape of the blow mold 5, this can produce a bottle that has a desired even or uneven distribution of thickness along its perimeter.

Figures 6A, 6B:
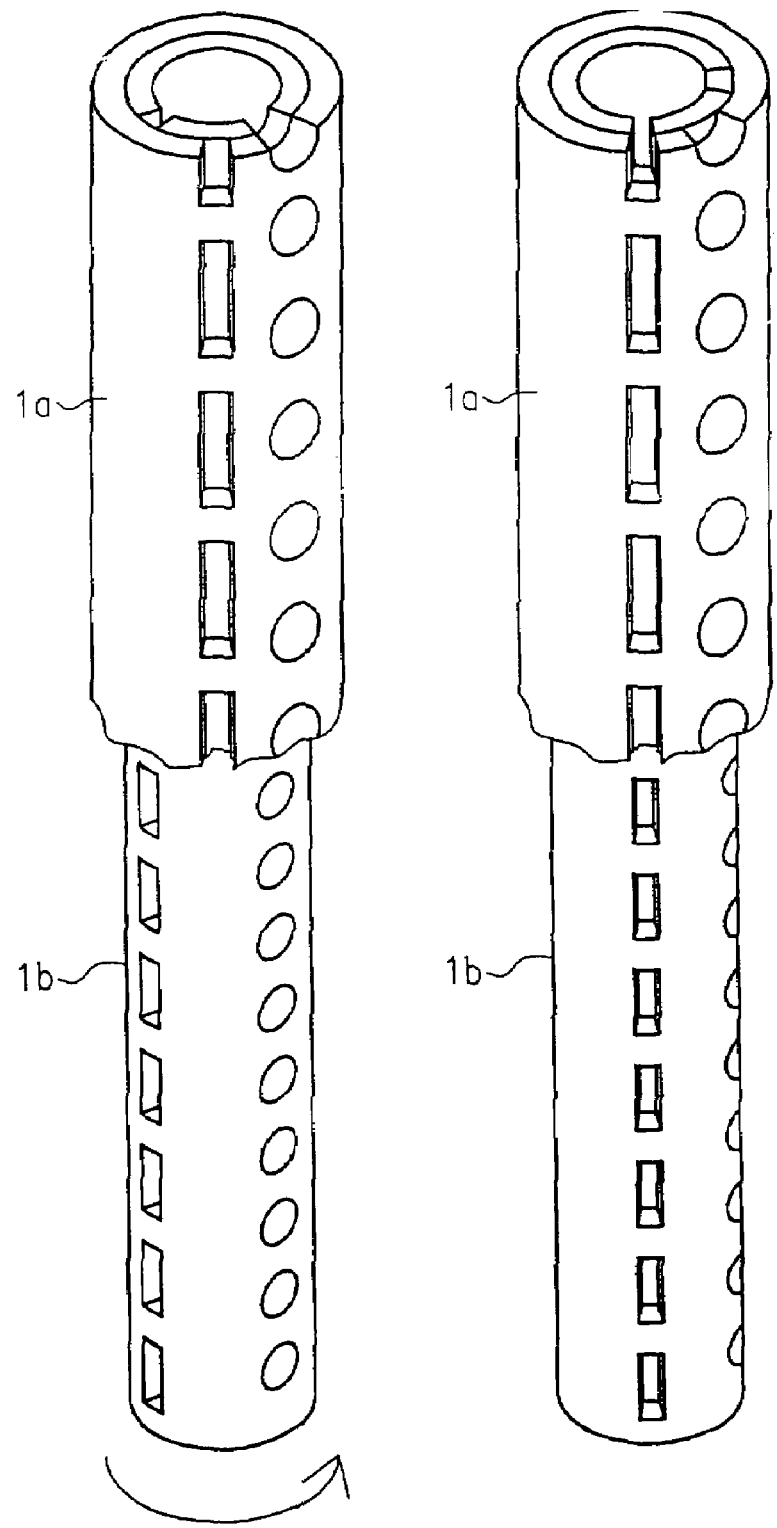

FIG. 6 shows a particularly advantageous embodiment of the device according to the invention. FIG. 6a shows a tempering device 1 that comprises two tubular elements 1a and 1b. In both tubular elements, there are holes or arrangements of slots or similar openings 3. In FIG. 6a, the two elements 1a and 1b are arranged such that the oval openings 3 on the right in FIG. 6a overlap as shown in FIG. 6a at the top. When the inside of the tubular elements are under increased air pressure, the gas can flow out through the overlapping openings of the elements 1a and 1b and contact the preform (not shown in FIG. 6a for the sake of clarity). The slot-like openings do not overlap so that no gas is released through these openings.

In FIG. 6b, the inner tubular section 1b is rotated slightly to the right in comparison to FIG. 6a. This causes the slot-shaped openings of elements 1a and 1b to overlap so that gas can exit through them if there is a gas overpressure in elements 1a and 1b. The exiting gas contacts the preform. The round or oval openings of the elements 1a and 1b in FIG. 6b do not overlap so that no gas is released outwards through these openings.

Element 1a is not completely shown in FIGS. 6a and 6b to reveal element 1b in the bottom section of the figures. Element 1a must be correspondingly extended in the bottom section of FIGS. 6a and 6b.

Figure 7A:
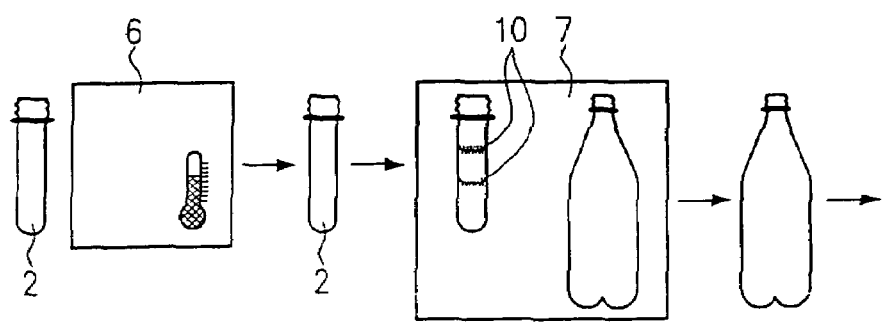

FIG. 7a shows a sketch of a possible embodiment of the device according to the invention as well as the method according to the invention. A preheating device 6 serves to evenly heat the preform 2. Usually, the bottom finger-shaped region is preheated that is to be deformed in the blow molding process. The collar and the threaded area at the top section of the preform 2 are usually not or only slightly preheated.

The tempering device 1 that selectively preheats the preform is integrated in a blow mold device 7. The selectively tempered zones 10 are schematically represented in FIG. 7. The device 7 is used to fabricate and output a device by means of blow molding.

Figure 7B:
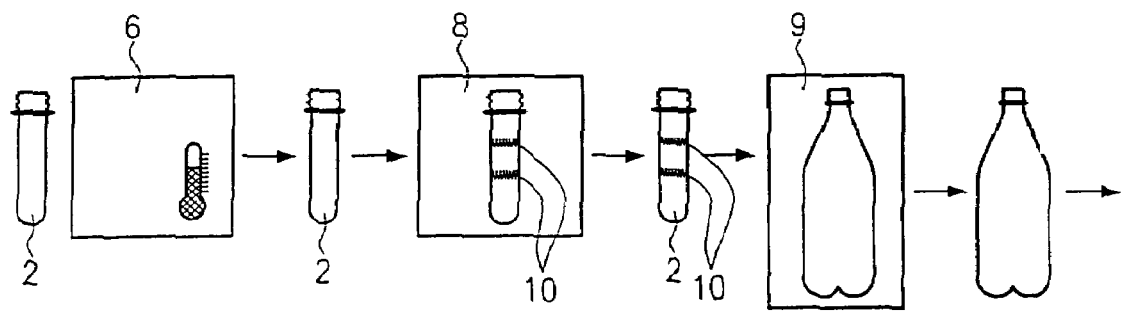

FIG. 7b also shows a preheating device 6 that can be used to evenly heat preforms 2. The preheating device 6 follows a device that selectively and directly tempers the preform 2. The areas 10 that have been selectively tempered are formed in device 8. Device 8 follows a conventional blow molding device 9 that manufactures bottles from the selectively preheated preforms 2. Device 8 can for example be designed as a wheel that precedes a blow molding device 9.

The invention claimed is:

1. Device for the manufacture of bottles, comprising:
a preform;
a tempering device disposed within the preform to selectively and directly temper the preform, wherein the tempering device is adapted so that the preform can be tempered in zones that are one of along, perpendicular to, and at angle to the preform axis, and further wherein the tempering device comprises a first and a second tubular element that move in relationship to each other, whereby the gas outlet arrangement of the first tubular element is in a first, relative position of the tubular elements that can move in relationship to each other, whereby the first relative position causes an overlap with the gas outlet arrangement of the second tubular element to provide selective tempering, and the gas outlet arrangement of the first tubular elements is in a second relative position of the tubular elements that can move in relationship to each other, whereby the second relative position causes an overlap with the gas outlet arrangement of the second tubular element to provide even tempering.

2. Device according to claim 1, wherein the tempering device is a radiant heater to selectively heat the preform.

3. Device according to claim 1, wherein the tempering device comprises at least one gas inlet device and at least one gas outlet for contacting the preform with one of cooled and heated gas.

4. Device according to claim 3, wherein the tempering device comprises at least one gas inlet to receive gas from the preform.

5. Device according to claim 3, wherein one of the gas inlet and the gas outlet is formed by one of a slot, a hole, a nozzle and other aperture.

6. Device according to claim 3, wherein several gas inlets and several gas outlets are arranged in one of circles and lines.

7. Device according to claim 1, further comprising means to move the tempering device in and out of the preform.

8. Method for tempering preforms used in the manufacture of bottles, the method comprising:
selectively interactively tempering the preforms and directly tempering the inside of the preforms, wherein selectively tempering the preforms comprises using a stretch rod in a blow molding process, contacting the preforms with one of cooled and heated gas through at least one gas outlet opening, and applying the cooled heated gas by emitting the gas through a first gas outlet arrangement of a first tubular element, surrounding the first tubular element with a second tubular element with a second gas outlet arrangement, whereby the gas outlet arrangements of the first and second tubular element partially overlap in a first relative position between the first and second tubular elements, and then moving the first tubular element and second tubular element into a second relative position in which the gas outlet arrangement of the first and second tubular element at least partially overlap to provide even tempering;
inserting the stretch rod in a preheated preform;
selectively cooling the preform, whereby the stretch rod is not moved relative to the preform; and
stretching the preform which is blow molded via the stretch rod.

9. Method according to claim 8, further comprising selectively tempering the preforms in zones which are one of along, perpendicular to, and at an angle to the preform axis.

10. Method according to claim 8, further comprising evenly heating the preforms before the step of selective tempering.

11. Method according claim 8, wherein the preforms are tempered with a radiant heater.

12. Method according to claim 8, further comprising capturing the gas from the preforms by the tempering device.

13. Method according to claim 8, further comprising cooling the finished bottles by evenly tempering them.

14. Device according to claim 3, wherein the cooled and heated gas is air.

15. Device according to claim 1, wherein the movement of the first and second tubular element in relationship to each other is one of rotation and shifting.

16. Method according to claim 8, wherein the gas is air.

17. Device according to claim 1, further comprising a preheating device to evenly heat the preform.

18. Device according to claim 1, wherein the tempering device is at least partially integrated in the stretch rod of a blow molding device.

19. Device according to claim 17, wherein the tempering device is provided on a transport device by means of which the preheated preform released by the preheating device can be transported to a blow mold device.

* * * * *